US010723278B2

(12) United States Patent
Bowles et al.

(10) Patent No.: US 10,723,278 B2
(45) Date of Patent: Jul. 28, 2020

(54) TRUNK MOUNTED RACK

(71) Applicant: Kuat Innovations, LLC, Springfield, MO (US)

(72) Inventors: Jordan K. Bowles, Ozark, MO (US); Joshua H. Schwartz, Springfield, MO (US); Aaron A. Houston, Springfield, MO (US); Michael Buis, Springfield, MO (US); Luke Kuschmeader, Springfield, MO (US)

(73) Assignee: KUAT INNOVATIONS LLC, Springfield, MO (US)

( * ) Notice: Subject to any disclaimer, the term of this patent is extended or adjusted under 35 U.S.C. 154(b) by 0 days.

(21) Appl. No.: 16/135,174

(22) Filed: Sep. 19, 2018

(65) Prior Publication Data

US 2019/0084492 A1    Mar. 21, 2019

Related U.S. Application Data

(60) Provisional application No. 62/560,521, filed on Sep. 19, 2017.

(51) Int. Cl.
*B60R 9/10* (2006.01)
*B60R 9/06* (2006.01)
*B60R 11/00* (2006.01)

(52) U.S. Cl.
CPC ............. *B60R 9/10* (2013.01); *B60R 9/06* (2013.01); *B60R 2011/0082* (2013.01); *B60R 2011/0085* (2013.01)

(58) Field of Classification Search
CPC ............. B60R 9/08; B60R 2011/0085; B60R 2011/0059; B60R 2011/0082; B60R 9/048; Y10S 224/924
See application file for complete search history.

(56) References Cited

U.S. PATENT DOCUMENTS

| | | | | |
|---|---|---|---|---|
| 5,645,202 A | * | 7/1997 | Kaloustian | B60R 9/06 224/314 |
| 6,386,407 B1 | * | 5/2002 | Erickson | B60R 9/10 224/282 |
| 6,422,443 B1 | * | 7/2002 | Erickson | B60R 9/06 224/492 |
| 7,055,725 B1 | * | 6/2006 | Kolda | B60R 9/06 224/497 |
| 7,810,685 B2 | * | 10/2010 | Bove | B60R 9/10 211/19 |
| D637,137 S | * | 5/2011 | Weaver | D12/408 |
| 8,028,878 B1 | * | 10/2011 | Pedrini | B60R 9/06 224/495 |
| 8,573,456 B2 | * | 11/2013 | Farber | B60R 9/10 224/314 |

(Continued)

*Primary Examiner* — Brian D Nash
(74) *Attorney, Agent, or Firm* — Kutak Rock LLP; James H. Jeffries (57) ABSTRACT

A bicycle rack for mounting on the trunk or rear hatch of a vehicle is described with improved mechanisms for adjusting the components of the rack to fit the rack to different vehicles. The rack is provided with hinge assemblies having releasable latches for quickly releasing the hinges to allow the rack components to be moved with respect to one another, and the latching components back into a fixed configuration during use for carrying a bicycle. The bicycle rack is also provided with inventive support members for holding a bicycle on the rack during use.

13 Claims, 12 Drawing Sheets

(56) References Cited

U.S. PATENT DOCUMENTS

| | | | | |
|---|---|---|---|---|
| D706,209 S | * | 6/2014 | Flaherty | D12/407 |
| 2002/0117524 A1 | * | 8/2002 | Jeong | B60R 9/06 224/314 |
| 2006/0032880 A1 | * | 2/2006 | Settelmayer | B60R 9/048 224/497 |
| 2006/0138186 A1 | * | 6/2006 | Pedrini | B60R 9/06 224/497 |
| 2006/0186161 A1 | * | 8/2006 | Huang | B60R 9/06 224/497 |
| 2007/0034657 A1 | * | 2/2007 | Murray | B60R 9/06 224/497 |
| 2010/0127031 A1 | * | 5/2010 | Sautter | B60R 9/06 224/500 |
| 2011/0068138 A1 | * | 3/2011 | Flaherty | B60R 9/06 224/324 |
| 2012/0234883 A1 | * | 9/2012 | Sautter | B60R 9/06 224/502 |
| 2013/0062384 A1 | * | 3/2013 | Phillips | B60R 9/10 224/500 |
| 2014/0239027 A1 | * | 8/2014 | Dickinson | B60R 9/06 224/534 |
| 2016/0001710 A1 | * | 1/2016 | Prescott | B60R 9/06 224/536 |
| 2016/0185304 A1 | | 6/2016 | Pedrini | |
| 2016/0355140 A1 | * | 12/2016 | Condon | B60R 9/06 |

* cited by examiner

TRUNK MOUNTED RACK

CROSS-REFERENCE TO RELATED APPLICATIONS

This application claims the benefit of U.S. Patent Application Ser. No. 62/560,521 filed Sep. 19, 2017, the disclosure of which is incorporated herein by reference.

BACKGROUND

Field of the Invention

The present invention relates to a rack for temporary mounting onto the trunk of a vehicle to secure and transport bicycles. Bicycle racks that are temporarily mounted to the trunk of a vehicle are well known and have been greatly improved over the yeas. The overall shapes, configurations, ease of operation are often the focus of changes to rack designs. Further, the means for securing the rack to the vehicle to which it is mounted, and the means for securing the bicycles to the rack are of paramount importance.

Description of the Related Art

Trunk racks are a common device used to haul bicycles on vehicles without roof rails or a hitch. Numerous racks have been designed for use on vehicle trunks or on the rear door of hatchback vehicles. Common methods for attaching a bicycle rack to the trunk of a vehicle or the rear hatch of a hatchback vehicle include the use of straps provided with hooks that are secured to the edges of the trunk lid or hatchback. Such hook mounted straps can also be used to connect the rack to the bumper or frame of the vehicle.

Current trunk mounted racks lack functionality and ease of use. Drawbacks include difficulty in adjusting the racks to securely fit on the vehicle while limiting movement during use. Such racks typically have a limited range of adjustment which limits the proper fit and function to a few vehicles. Many racks have insufficient connectors to fasten bicycles to the rack. As mentioned, movement of the rack or the bicycles during use is not desirable as it may damage bicycles, the vehicle or both.

SUMMARY OF THE INVENTION

In various embodiments described in detail below, the adjustable bicycle rack for mounting on a vehicle comprises a pivot member, a first portion comprising at least one first base member and at least one first support member, a second portion comprising at least one second base member and at least one second support member. A first end of each of the at least one second base member is attached to the pivot member, and a second end of each of the at least one second base member is attached to one of the at least one second support member. The rack further comprises at least one hinge assembly pivotally attached to the pivot member, wherein a first end of each of the at least one first base member is attached to one of the at least one hinge assembly, and a second end of each of the at least first base member is attached to one of the at least one first support member.

The rack further comprises a latch assembly attached to each of the at least one the hinge assembly, the latch assembly comprising a latch actuator and a latch pin connected thereto, and at least one bicycle support member, wherein the first end of each of the at least one bicycle support member is pivotally attached to the pivot member, wherein the pivot member is provided with a plurality of channels for receiving the latch pin.

The latch actuator may be selectively actuated to insert or remove the latch pin from one of the plurality of channels for releasably securing the hinge assembly and the lower portion with respect to the pivot member.

In a specific embodiment, the adjustable bicycle rack for mounting on a vehicle comprises a pivot member provided with a plurality of channels on a toothed ring attached to the pivot member, a first hinge assembly and a second hinge assembly pivotally attached to the pivot member, a first latch assembly attached to the first hinge assembly, and a second latch assembly attached to the second hinge assembly, an upper portion comprising a first upper support member, a second upper support member, and an upper base member, wherein a first end of each of the first upper support member and the second upper support member are attached to the pivot member, and a second end of each of the first upper support member and the second upper support member are attached to the upper base member, and a lower portion comprising a first lower support member, a second lower support member, and a lower base member, wherein a first end of each of the first lower support member and the second lower support member are attached to the first hinge assembly and second hinge assembly, respectively. The adjustable bicycle rack further comprises at least one bicycle support member with at least one bicycle attachment assembly disposed on each such member.

DETAILED DESCRIPTION

Bicycle racks are often provided for removable mounting onto the truck, rear hatch, or rear end of a vehicle. The racks often have an upper support structure or frame, and a lower support structure or frame, that rest on an upper and lower surface of a vehicle, respectively. In some uses of such racks, these surfaces may include a bumper as the lower surface, and the top of the trunk as the upper surface. In other embodiments, they upper and lower surfaces may comprise the upper and lower portions of a rear hatch, respectively.

Other options for installation may also be used with various embodiments of these racks. The upper and lower support structures of such racks often need to be adjusted with respect to each other and to elements of the rack provided for the support of one or more bicycles. The inventive rack 100 described below is provided with improved devices for adjusting the various members of the rack with respect to one another to fit the rack to a variety of vehicles in a quick and secure manner.

Referring now to the drawings, embodiments of the inventive bicycle rack 100 for mounting on a vehicle trunk are depicted. In the various depicted embodiments, the rack 100 includes a lower portion 102, an upper portion 104, one or more bicycle support members 106, and one or more hinge assemblies 108. In the depicted embodiments, the rack 100 is provided with two hinge assemblies 108 disposed at either end of a central pivot member 110, however in other embodiments the rack 100 may have only one or more than two hinge assemblies 108.

In the depicted embodiments, the upper portion 104 comprises a U-shaped assembly with a first and second upper support member 112, and an upper base member 114. In the depicted embodiments, a first end 120 of each upper support member 112 is attached to a hinge assembly 108. The opposed second end 122 of the upper support member 112 is attached to upper base member 114. The upper base member 114 contacts the vehicle to which the rack 100 is attached to provide support to the rack 100. In other embodiments of the bicycle rack 100, only one or more than two support members 112 may be provided, and the upper base member 114 may comprise a shortened member or cap for each upper support member 112, or may be attached to the second end of the upper support member 112 at a midpoint of the upper base member 114. The scope of the present invention is not limited by the particular arrangement of support members shown in the depicted embodiments.

Similarly, in the depicted embodiments, the lower portion 102 comprises a U-shaped assembly with a first and second lower support member 116, and a lower base member 118. In the depicted embodiments, a first end 120 of each upper support member 116 is attached to a hinge assembly 108. The opposed second end 122 of the lower support member 116 is attached to lower base member 118. The lower base member 118 contacts the vehicle to which the rack 100 is attached to provide support to the rack 100. In other embodiments of the bicycle rack 100, only one or more than two support members 116 may be provided, and the lower base member 118 may comprise a shortened member or cap for each lower support member 116, or may be attached to the second end of the lower support member 116 at a midpoint of the lower base member 118. The scope of the present invention is not limited by the particular arrangement of support members shown in the depicted embodiments.

Each support member 112 or 116 is a structural member formed from metal, composite, plastic, other similar materials, or a combination of those materials, and may be hollow, solid, or channeled as required by the material and application. In preferred embodiments, the support members 112 and 116 are formed from hollow metal members having a circular, oval, polygonal, rectangular, or similar cross-section. Similarly, the base members 114 and 118 may be formed from a variety of materials with suitable properties to provide support as required by the specific design of an embodiment of the rack 100, and may be metal, composite, plastic, rubber, similar materials, or a combination of those materials, formed with a variety of cross-sections, and may be hollow, solid, or channeled as required by the material and application. In some embodiments, the support members 112 and 116 may be formed unitarily as a single piece with the base members 114 and 118, respectively.

At least one of the lower portion 102 and upper portion 104 is attached to the pivot member 110 by hinge assemblies so that the orientation of that portion, with respect to the pivot member 110, may be adjusted with respect to the other portion.

In the depicted embodiment, each hinge assembly 108 is provided with first leaf 126 and a second leaf 124. The first end 120 of each support arm 112 is attached to a first leaf 126 of a hinge assembly 108. The first end 120 of each support arm 116 is attached to a second leaf 124 of a hinge assembly 108. The first leaf 126 and second leaf 124 pivot with respect to each other around the axis of the pivot member 110 to allow the angle between the lower portion 102 and upper portion 104 to be adjusted to fit a particular vehicle. In the depicted embodiments, the first and second leaf comprise sockets for receiving an end of a support member, but in other embodiments they may comprise inserts that fit into a hollow support member or channels therein, or comprise a mounting plate to which the support member is fastened. In the depicted embodiments, the second leaf 124 may be fixedly attached to the pivot member 110.

In some embodiments, the hinge assembly 108 may only have one hinge leaf for attachment to the portion (upper or lower) that pivots around the pivot member 110. The other portion may be attached to pivot member 110 by a part of the hinge assembly 108 or by another connection or mounting fixture.

Each bicycle support member 106 is provided with one or more bicycle attachment assemblies 128. The bicycle attachment assemblies 128 are provided with a means of attaching a bicycle to the bicycle support member 106 to hold the bicycle in place during use of the rack 100. In various embodiments of the rack 100, the bicycle attachment assembly 128 may comprise one or more types of attachments suitable for this purpose. In some embodiments, the assembly 128 may comprise a strap releasably attached to the member 106 to hold the frame or another part of the bicycle against the member 106. In other embodiments, the assembly 128 may comprise hooks, clamps, or other types of releasable anchors. Specific embodiments of the bicycle attachment assembly 126 are described in relation to later figures.

Each bicycle support member is pivotally attached to the rack 100 by a bicycle support hinge assembly 130. The hinge assembly 130 allows the bicycle support member 106 to be rotated around the pivot member 110 so that the rack 100 may be adjusted for a variety of different vehicles or folded into a storage configuration where the members 106 pivoted around pivot member 110 until they are aligned with and substantially between the support members 112 and 116.

Figure 1A:
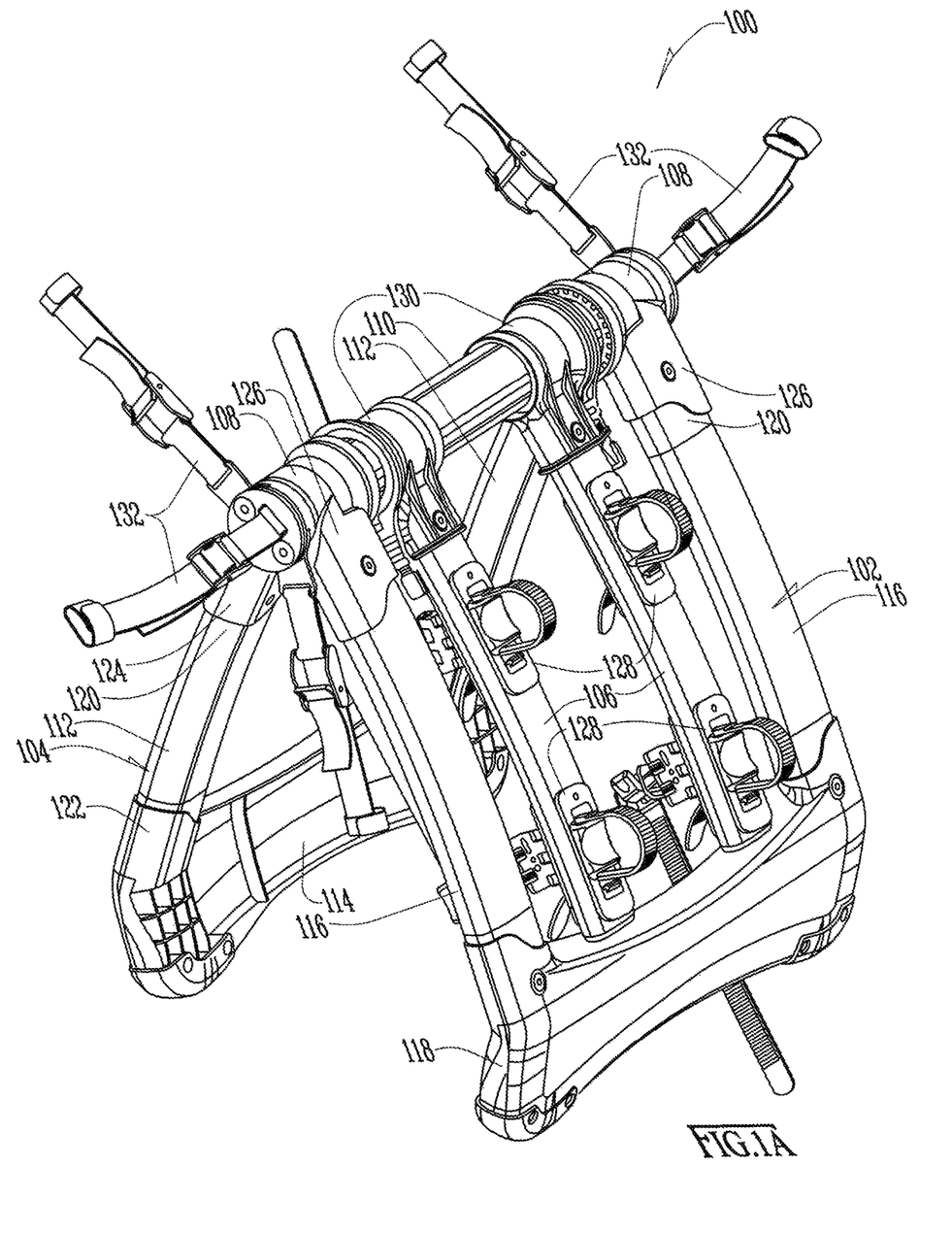
FIG. 1A is a perspective view of an embodiment of the inventive bicycle rack in a folded configuration.
Figure 1B:
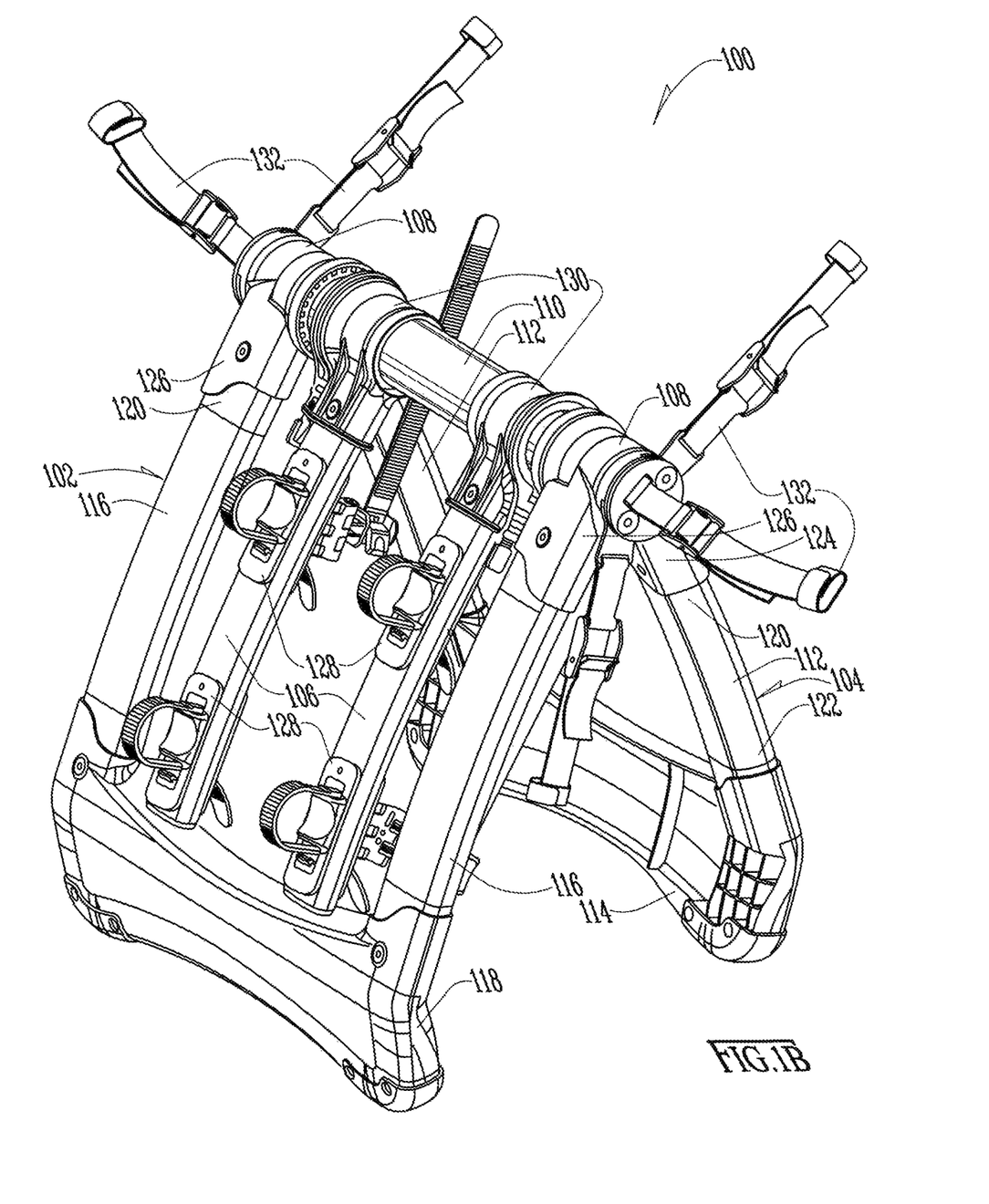
FIG. 1B is a perspective view of an embodiment of the inventive bicycle rack in a folded configuration.
Figure 1C:
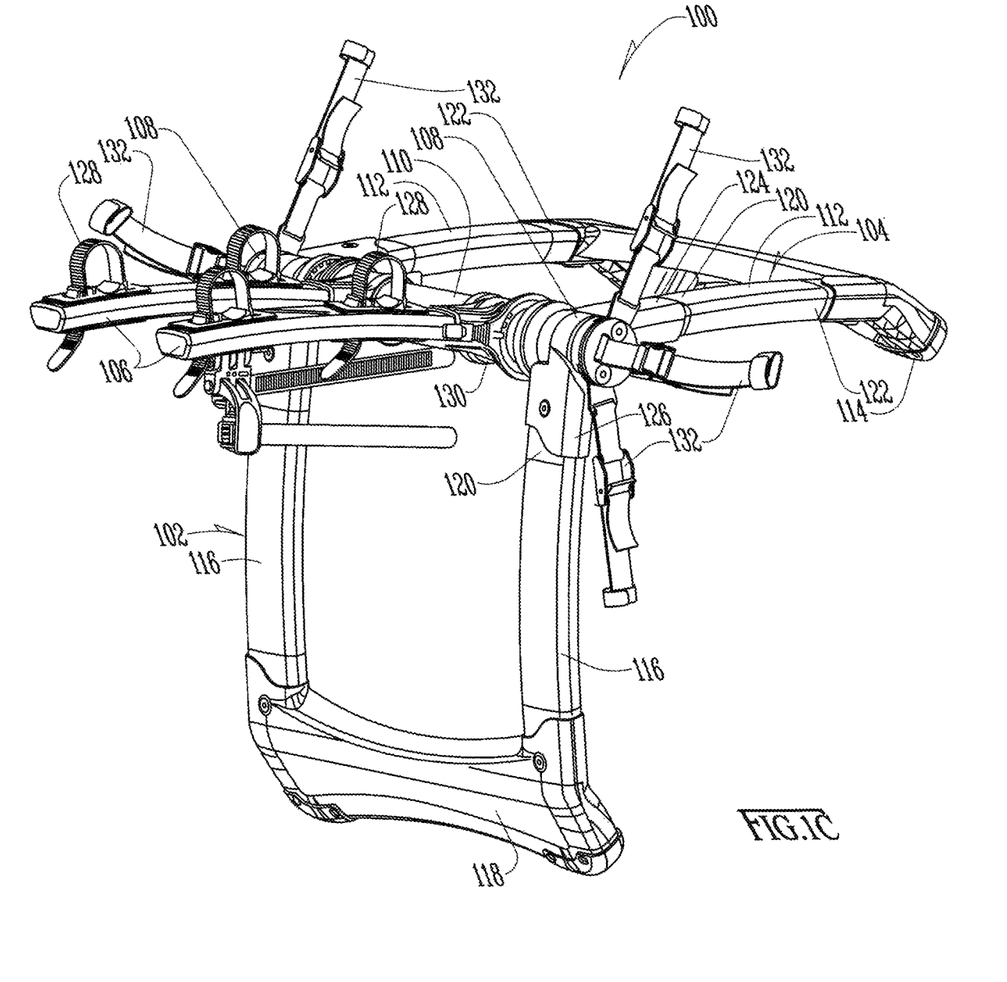
FIG. 1C is a perspective view of an embodiment of the inventive bicycle rack in an open configuration.
Figure 1D:
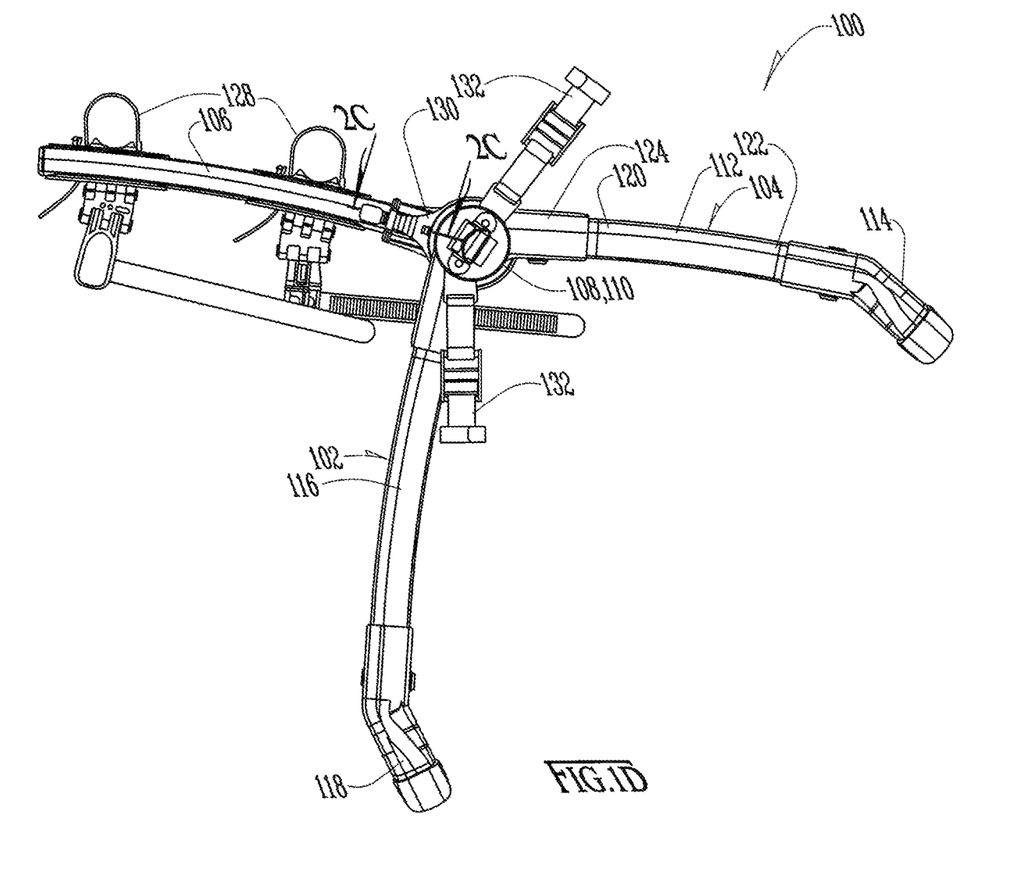
FIG. 1D is a side view of an embodiment of the inventive bicycle rack in an open configuration.
Figure 1E:
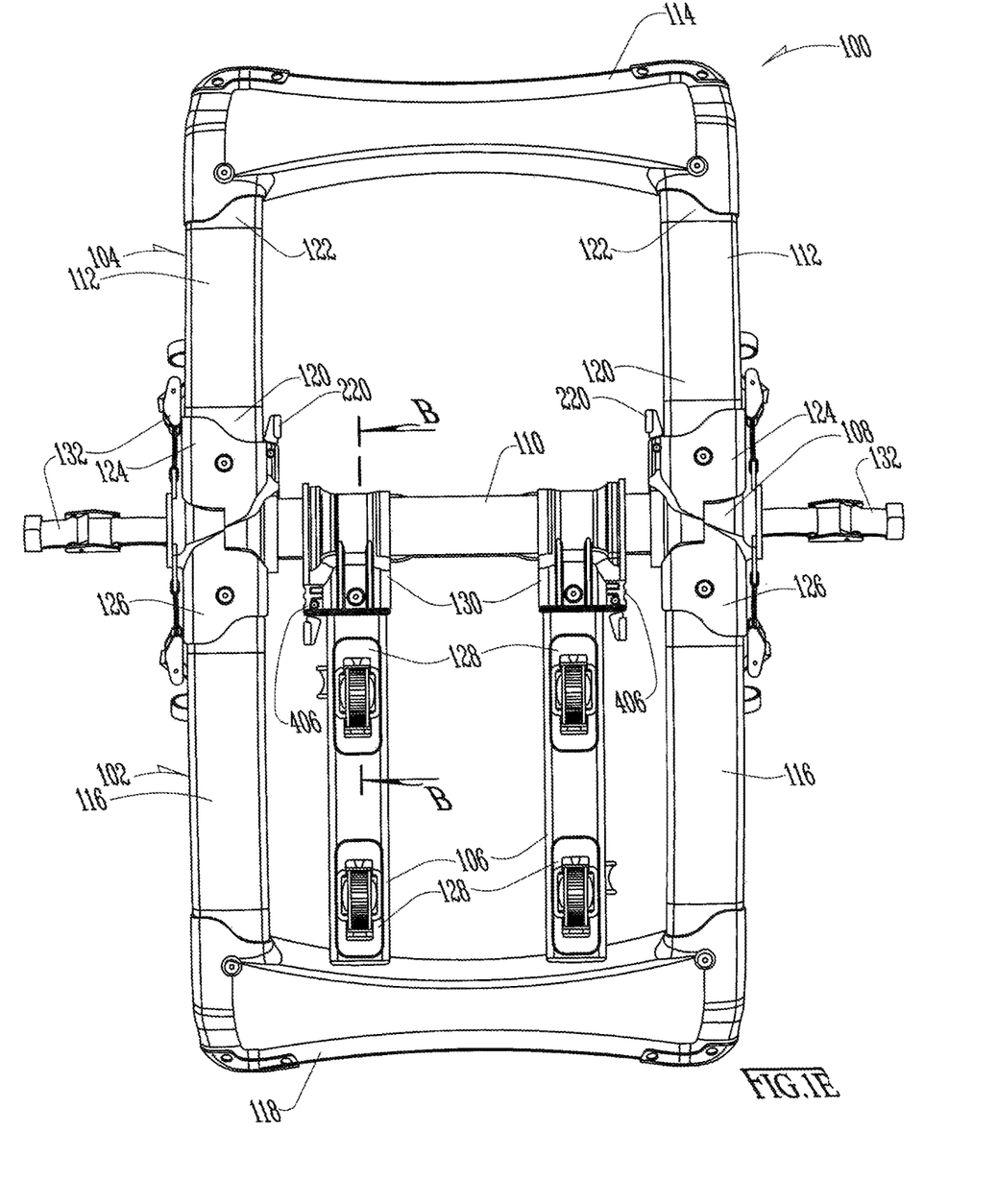
FIG. 1E is a perspective view of an embodiment of the inventive bicycle rack in an open configuration.

The adjustability of the various members allow the rack 100 to be "folded" into a compact "closed" configuration, such as shown in FIG. 1B, when not in use. The rack 100 may then be "unfolded" by adjusting the upper and lower portion members as needed to fit onto a specific vehicle, such as the "open" configuration shown in FIG. 1C. In some embodiments of the rack 100, once the upper and lower support frames are adjusted to securely fit onto the vehicle, it may be desired to adjust the bicycle support members to be substantially horizontal as shown in FIGS. 1C and 1D, or in some other preferred orientation based on the specific design of the bicycle support members.

Figure 2A:
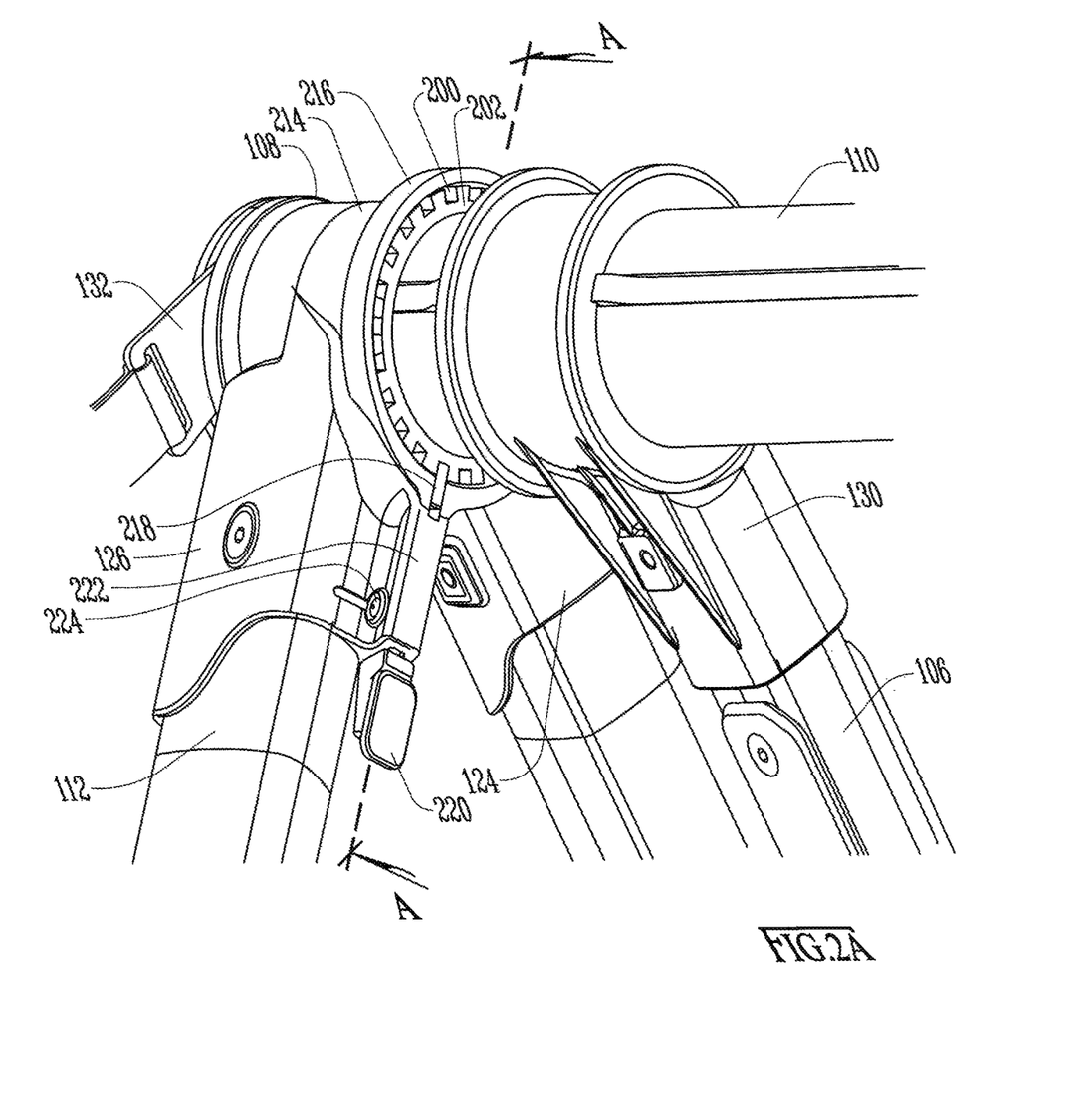
FIG. 2A is a perspective view of a portion of an embodiment of the inventive bicycle rack.
Figure 2B:
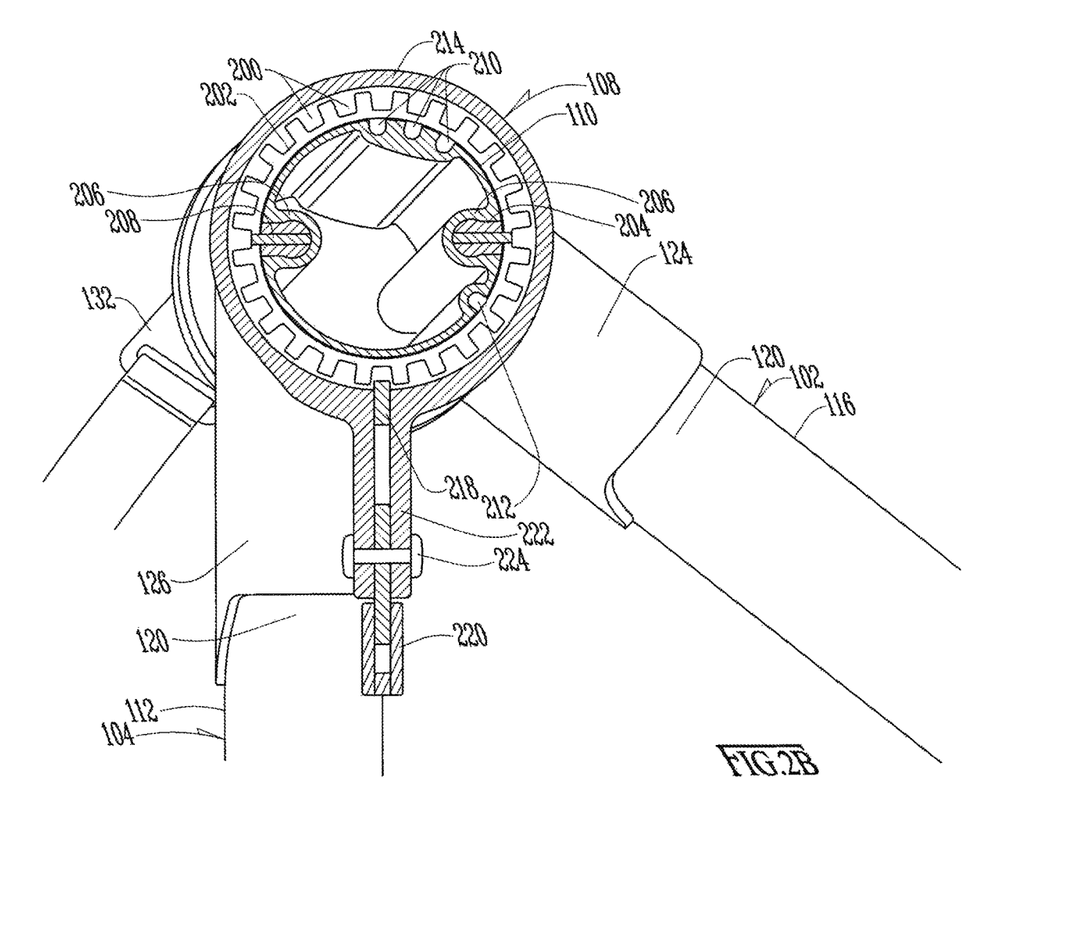
FIG. 2B is a cross-sectional view of a portion of an embodiment of the inventive bicycle rack.

Referring now to FIGS. 2A and 2B, a detailed perspective view and a cross-sectional view along axis A-A of an embodiment of the hinge assembly 108 are depicted, respectively. The pivot member 110 depicted in the figures is a hollow member that is substantially circular in cross-section. In other embodiments, the pivot member 100 may be partially or completely solid. The pivot member 110 is provided with a plurality of channels or recesses 200. In the depicted embodiment, these channels 200 are provided by a toothed ring 202 that is fixedly attached to pivot member 100 by appendages 204 that are inserted into channels 206 or by screws 208 in some embodiments. In other embodiments, channels 200 may be provided directly in the pivot member 100 itself such as channels 210 and 212. In the depicted embodiment, the channels 200 are provided around the entire circumference of pivot member 110, however in some embodiments the channels 200 may only be provided on certain portions of the circumference of pivot member 110.

In the depicted embodiment, the hinge leaf 126 is attached to or formed unitarily with hinge barrel 214. In various embodiments, hinge barrel 214 may completely or partially surround pivot member 110. Hinge barrel 214 is disposed around pivot member 110 and capable of revolving around pivot member 110. The hinge barrel 214 may be provided with an optional flange 216 extending around or over the channels 200. A latch pin 218 is moveably attached to hinge leaf 126 or hinge barrel 214 for selectively engaging the channels 200 to hold the hinge assembly 108 in a fixed position with respect to pivot member 110. An actuator 220 is provided for selectively engaging or disengaging the latch pin 218 from one of the channels 200. When the latch pin 218 is in a disengaged position, hinge leaf 126 and hinge barrel 214 may be rotated around the pivot member 110. When the latch pin 218 is engaged in a channel 200, the pin 218 prevents rotation of the hinge leaf 126 with respect to pivot member 110 and holds the hinge assembly 108 in a fixed position.

In a preferred embodiment, hinge leaf 124 may be fixedly attached to pivot member 110 to prevent its rotation with relation to the pivot member 110. In other embodiments, hinge leaf 124 may be pivotally attached to pivot member 110 with some method of fixing it in desired orientation with respect to the pivot member 110. In other embodiments of the rack 100, hinge leaf 124 may be formed as part of pivot member 110. In other embodiments, the hinge leaf 124 and the pivot member 100 may be formed from a single component. In other embodiments, pivot member 110 and lower support member 112 may be formed from a single component or attached together without a hinge leaf 124.

Since in some embodiments the hinge assembly 108 described herein may be attached to the lower portion 102 of the rack, and in other embodiments to the upper portion 104 of the rack, it is necessary to be able to refer to whichever portion and subcomponents thereof are attached to the hinge assembly without reference as to whether it is the upper or the lower portion. Thus, when referring to the upper and lower portions, the upper and lower base members, and the upper and lower support members, a reference to the first portion, the second portion, the first base members, the second base members, the first support members, and the second support members shall refer respectively to either upper or lower portions or components. In this manner, references to the components in the claims may be described in relation to which components attach to the hinge assembly, and not which components are on the upper or lower portion of the rack.

Figure 2C:
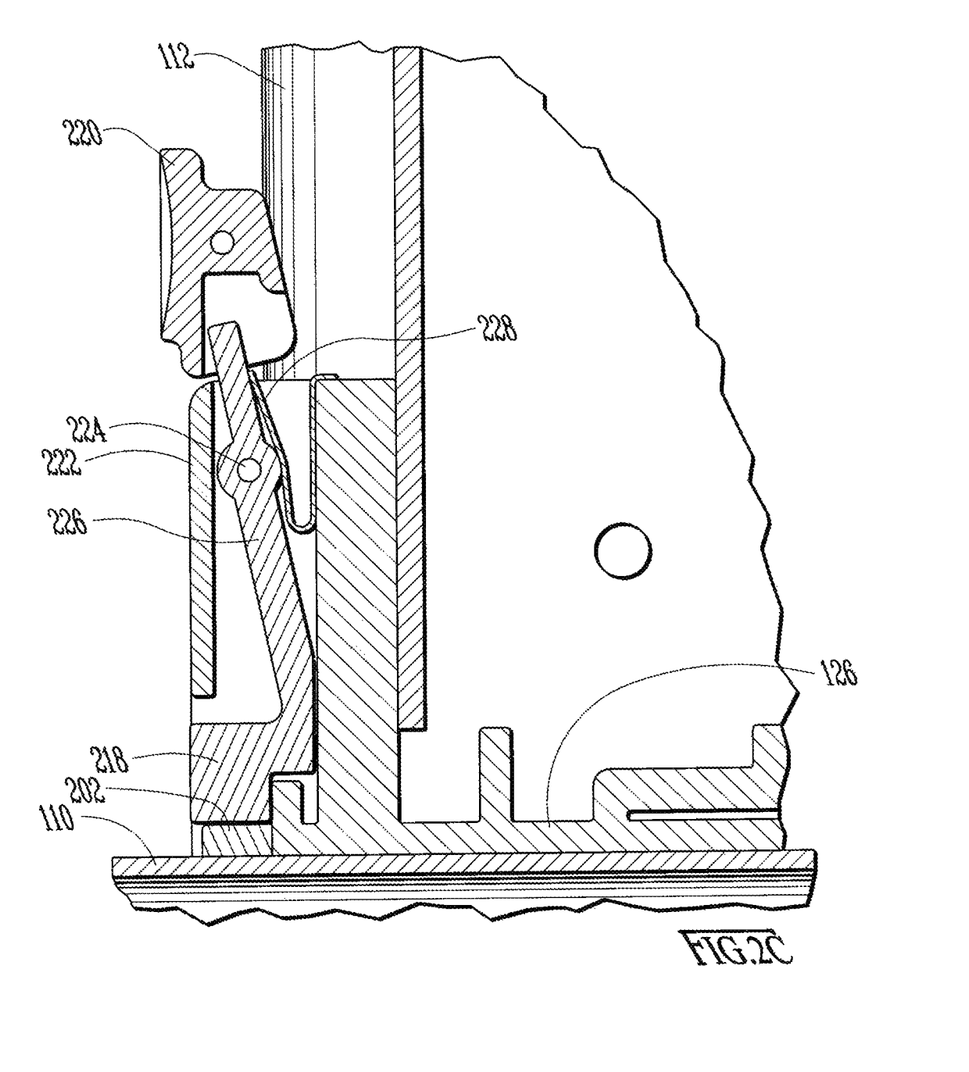
FIG. 2C is a cross-sectional view of a portion of an embodiment of the inventive bicycle rack.

Referring now to FIG. 2C, a cross-sectional view along axis B-B of the hinge assembly 108 is depicted. In various embodiments of the rack 100, various methods of actuating the latch pin 218 to selectively move it from an engaged to a disengaged position may be utilized without departing from the scope of the inventive device. In the depicted embodiment of the rack 100, the actuator 220 is attached to, or formed as part of, a first end of latch lever 226, and latch pin 218 is attached to a second end of latch lever 226, or is formed as part of latch lever 226. The latch lever 226 is pivotally attached to latch mount 222 by latch pivot pin 224. Spring 228 is mounted between hinge leaf 126 and the portion of the lever arm 226 between the latch pivot pin 224 and the first end of the latch lever 226.

When a user depresses actuator 220 in the direction of upper support member 112, the lever 226 pivots around latch pivot pin 224. The pivotal movement of lever 226 causes the latch pin 218 to move away from hinge leaf 126 and out of channel 200. Once pin 218 is out of channel 200, the hinge leaf 126 may be rotated around pivot member 110 to adjust the orientation of the support lower portion 102 and the upper portion 104 to each other. Once the hinge leaf 126 and upper support member 112 is in a desired orientation with respect to pivot member 110, the user may release actuator 220. The pivotal movement of the actuator 220 toward upper support member 116 also compresses spring 228. When the user releases actuator 220, spring 228 pushes the first end 226 away from upper support member 116, causing the lever 226 to rotate in the opposite direction and causing latch pin 218 to be reinserted into one of the channels 200.

Figure 3:
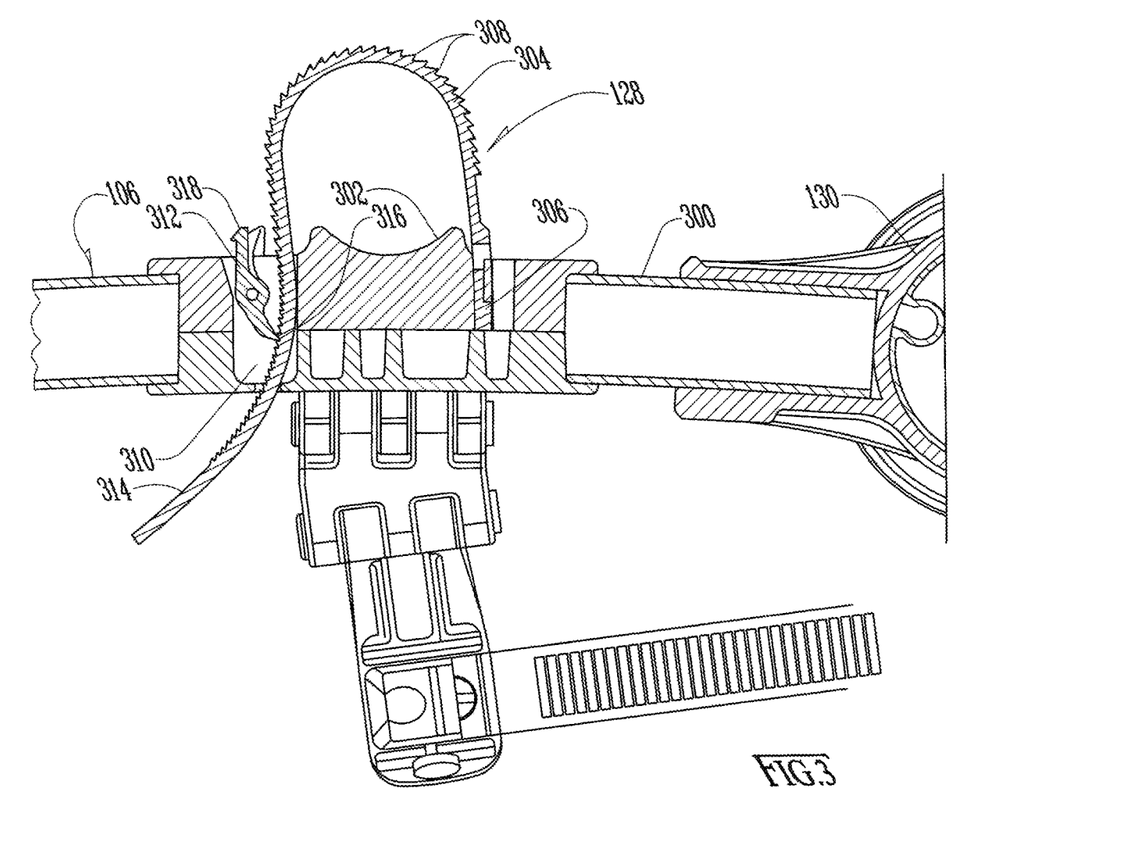
FIG. 3 is a cross-sectional view of an embodiment of the inventive bicycle rack in an open configuration.

Referring now to FIG. 3, a cross-sectional view of an embodiment of one of the bicycle support members 106 is depicted. The cross-sectional view extending along the length of bicycle support member 106 depicts an embodiment of a bicycle attachment assembly 128. The bicycle support member 106 is pivotally attached to the rack 100 at a first end 300 of the member 106. The attachment assembly 128 is disposed at a point along the length of the support member 106 for receiving and holding a bicycle, typically by supporting and engaging a portion of the frame of the bicycle. The portion of the frame of the bicycle may comprise a tube formed from metal, composite, or other types of materials used to create the frame of the bicycle. The depicted embodiment of the attachment assembly 128 is provided with a rest 302 for receiving and holding the frame of the bicycle, and a flexible strap 304 for wrapping around the frame of the bicycle and releasably holding the frame of the bicycle on the rest 302. In the depicted embodiment, the strap 304 is attached to support member 106 at a first end 306 of the strap 304. This embodiment of the strap 304 is provided with teeth 308 on one side of the strap 304 that are angled toward the first end 306 of strap 304.

A slot or aperture 310 having side surfaces is provided in support member 106, and a pawl 312 is pivotally mounted in slot 310. A second end 314 of strap 304 is inserted into slot 310 around the bicycle frame to hold it on the rest 302. The pawl tooth 316 on pawl 312 is disposed at an angle pointing into the slot 310, and engages angled teeth 308 on strap 304 to prevent the strap 304 from being withdrawn from slot 310, thus holding the bicycle frame against rest 302. The angle of the teeth 308 allows the pawl tooth 316 to slide over the teeth 308 while the strap 304 is being inserted into the slot 310, but to catch on the teeth 308 when a force attempts to pull strap 304 out of the slot 310. By pulling the strap 304 through the slot 310 until the strap 304 securely holds the bicycle frame against rest 302, a bicycle may be held on the rack 100.

When a user desires to withdraw the strap 304 from the slot 310 to remove the bicycle from the rack 100, the pawl lever 318 is depressed to cause pawl 312 to pivot and to pull pawl tooth 316 away from contact with strap 304, thus disengaging the pawl tooth 312 from the teeth 308 on strap 304.

Figure 4:
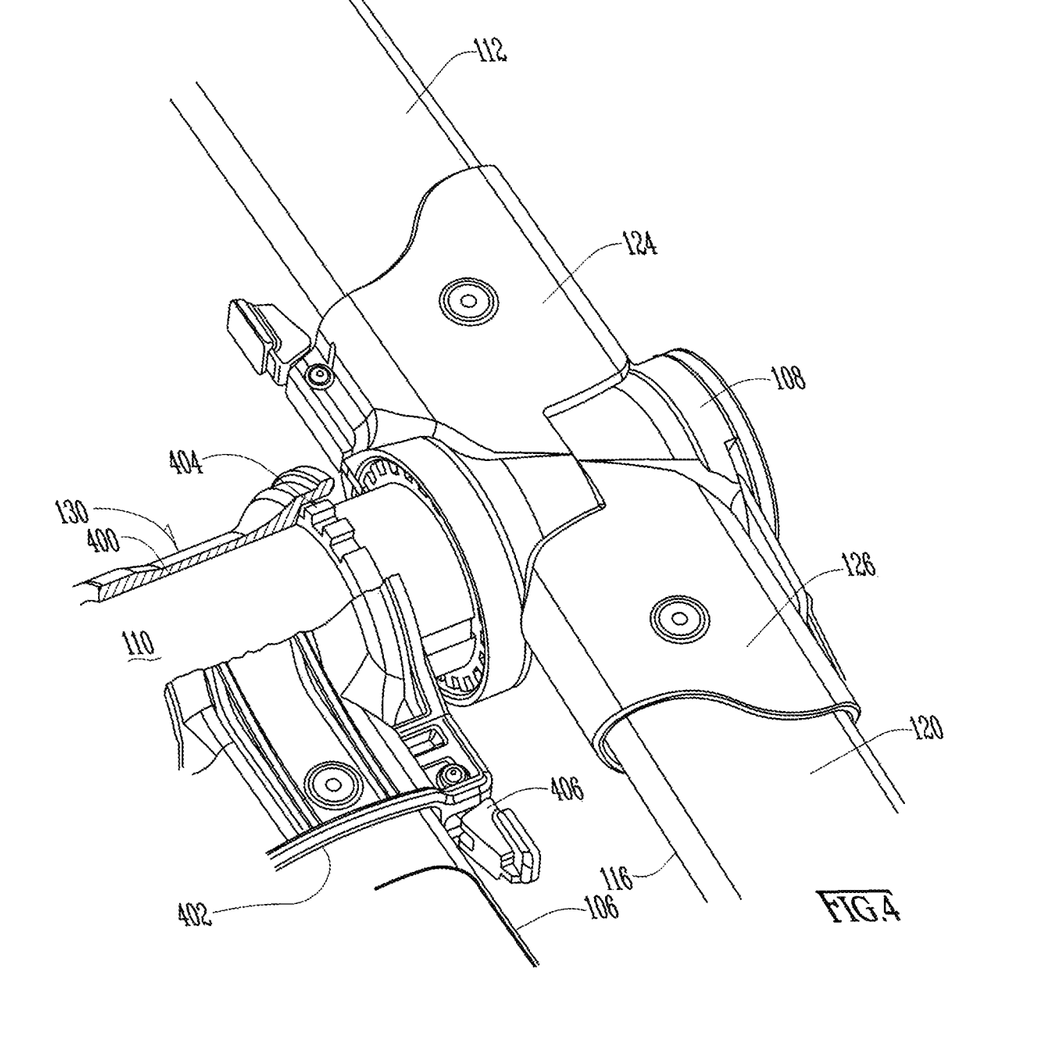
FIG. 4 is a perspective view of a portion of an embodiment of the inventive bicycle rack.

Referring now to FIG. 4, an embodiment of the hinge assembly 130 is depicted. The depicted embodiment of the hinge assembly 130 comprises a pivot mount for pivotally holding the bicycle support member 106 on the pivot member 110. In this embodiment, the pivot mount 400 is a full or partial cylinder that is slidably disposed around pivot member 110. The depicted embodiment of mount 400 has socket 402 extending outwardly from the pivot mount 400. The socket 402 receives the first end 300 of support member 106. In other embodiments, the pivot mount 400 and bicycle support member may be formed as a single piece, without a socket 402. In other embodiments, the socket 402 may be an insert component for inserting into a hollow end of bicycle support member 106. In yet other embodiments, the socket 402 may be replaced with one or more plates or brackets that are attached to the pivot mount 400 and bicycle support member 106.

In the embodiment of the rack 100 shown in FIG. 4, a toothed ring 404 is fixedly attached to, or formed as part of, pivot member 110. A latch assembly 406 is provided on pivot mount 400 or as part of bicycle support member 106. In the depicted embodiment, the latch assembly 406 is substantially the same in design and operation as the latch described with reference to FIGS. 2A, 2B, and 2C. A user may disengage the latch assembly 406 as previously described, rotate the bicycle support member 106 to a desired position, and engage the latch assembly 406 to secure the member 106 in the desired position.

Figure 5A:
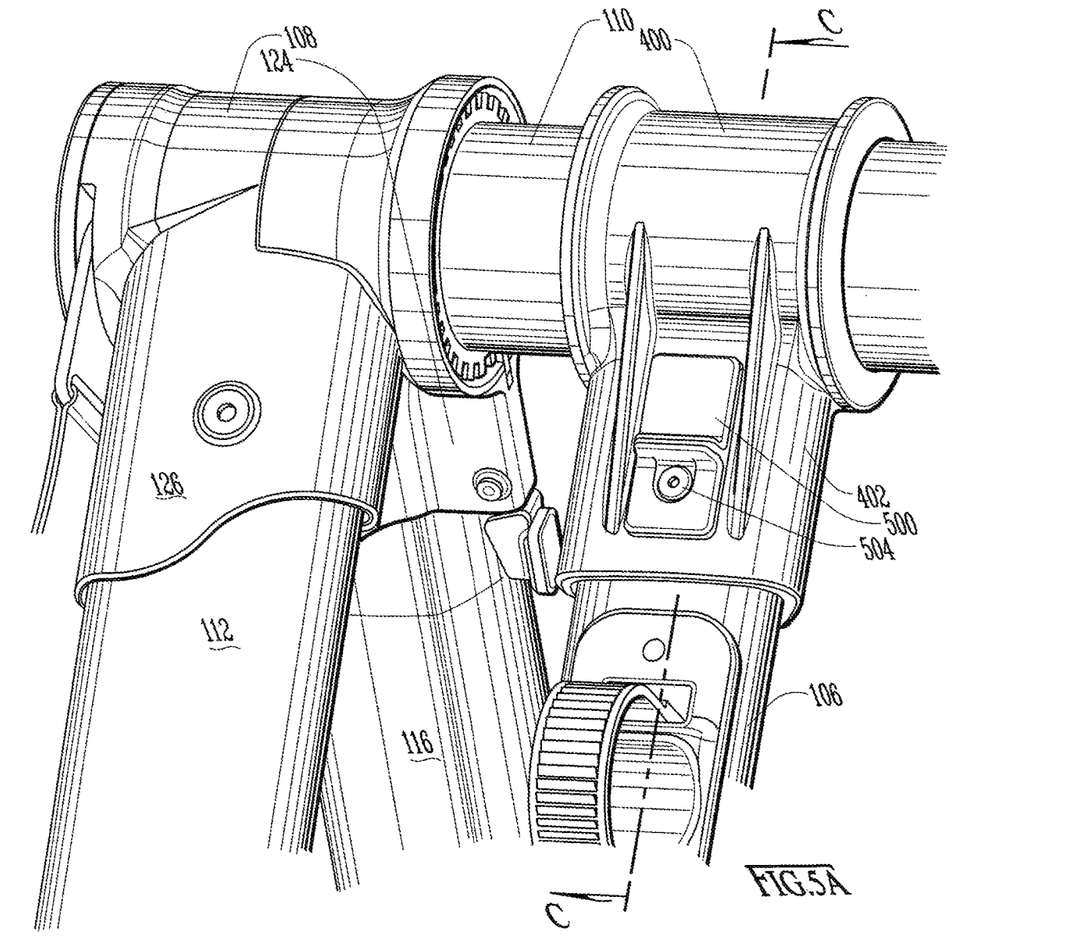
FIG. 5A is a perspective view of a portion of an embodiment of the inventive bicycle rack.
Figure 5B:
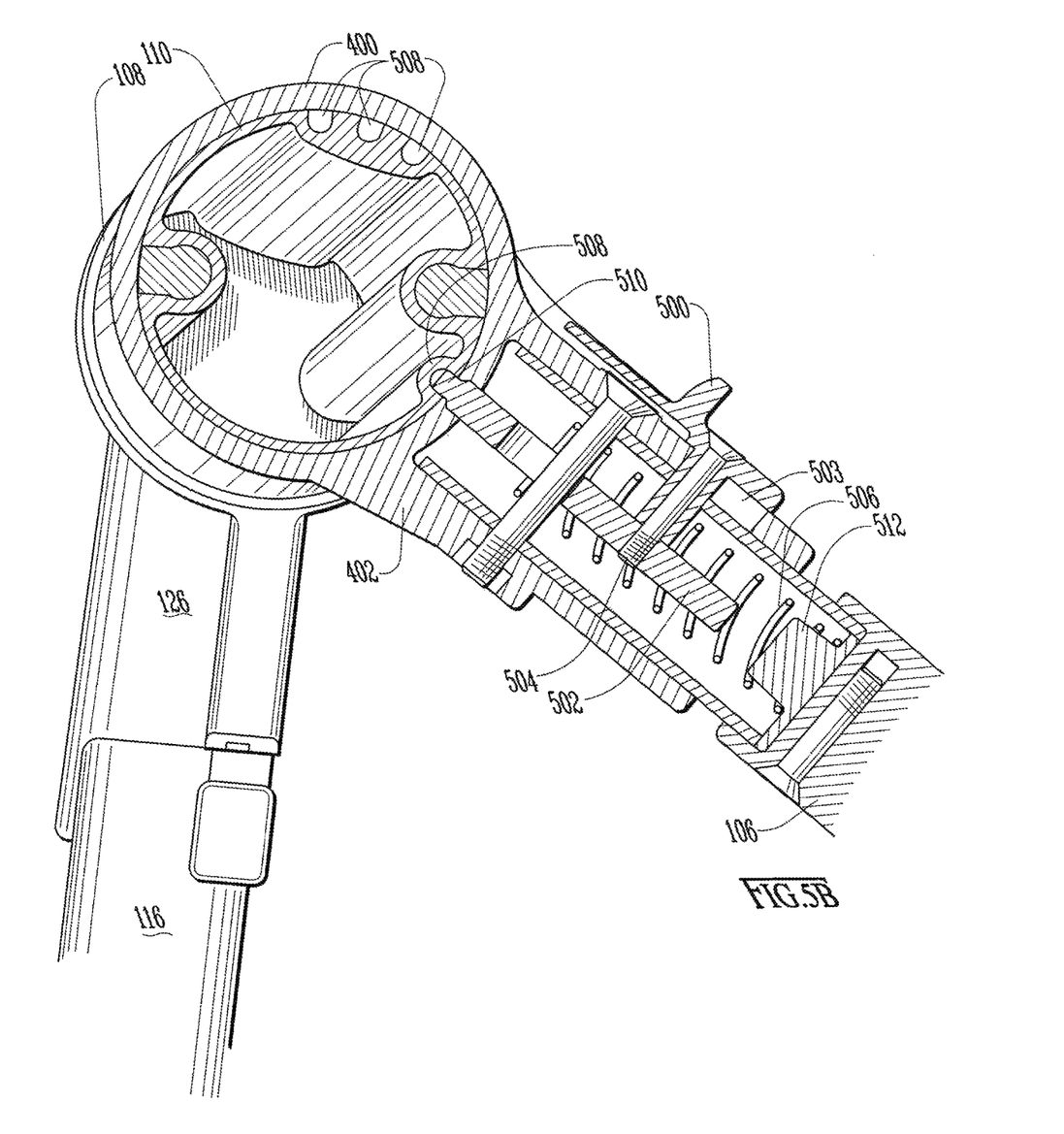
FIG. 5B is a cross-sectional view of a portion of an embodiment of the inventive bicycle rack.

Referring now to FIGS. 5A and 5B, a perspective and a cross-sectional view of an alternative embodiment of the bicycle support member 106 is depicted. In this embodiment, the pivot mount 400 and socket 402 are rotatably disposed on pivot member 110. Pivot member 110 is provided with one or more channels 508 along at least a portion of the length of the pivot member 110 where the bicycle support member 106 is disposed. In this embodiment, a latch actuator 500 is provided on socket 402 that slides toward and away from the pivot member 110 in a slot 503 provided in socket 402. The latch actuator 500 is attached to a carrier 504 that extends inwardly from the latch actuator 500, through a slot or hole in the pivot mount 402 into a cavity provided therein. A spring 506 is disposed in the cavity such that it pushes on carrier 504 to push actuator 500 toward the pivot member 110 unless a user exerts a force on latch actuator 500 to push it away from the pivot member 110 compressing spring 506 against a stop 512 provided in the cavity. A latch pin 502 is attached to carrier 504 and extends toward the pivot member 110. In some embodiments the socket 402 and the parts of this latch embodiment may be incorporated into the support member 106.

In a latched configuration, a first end 510 of latch pin 502 extends through an aperture in the pivot mount 400 and into one of the channels 508 in pivot member 110. The extension of the pin into the channel 508 prevents the rotation of pivot mount 400 and bicycle support member 106 with respect to pivot member 110.

A user may disengage the latch by applying a force to actuator 500 to slide it away from the pivot member 110. The movement of the latch actuator 500 causes carrier 504 to also move away from pivot member 110 thereby retracting latch pin 502 from the channel 508. While latch pin 502 is retracted, the bicycle support member 106 and pivot mount 400 may be rotated around the pivot member 110 to a desired position, at which time the user may release actuator 500 and the spring 506 forces carrier 504 towards the pivot member, and latch pin 502 into a channel 508.

The various members of the bicycle rack 100 may be manufactured from composite materials, aluminum or other metals, plastic, graphite, carbon fiber, laminates, or other materials with sufficient strength without departing from the scope of this patent.

To secure the rack to the trunk of a vehicle, multiple strap assemblies 132 are provided. It in the depicted embodiments, the straps 132 connect at or near the ends of pivot member 110. The number of straps may vary in embodiments of the rack, but in a preferred embodiment of the rack 100 two straps are provided to secure the rack to the vehicle. In some embodiments, three straps are provided at each end of the pivot member 100 to allow the rack to attach to the front, rear and sides of the vehicle trunk, hatch or bumper for greater stability at the rack to vehicle interface during use. This arrangement eliminates forward, rearward or side to side movement of the rack that is common with trunk mounted racks.

When the rack 100 is not in use on a vehicle, the lower portion 102, the upper portion 104, and the bicycle support members 106 may all be rotated into a folded or closed configuration having all of the members as close together as allowed by the design of the rack 100, to provide for reduced space requirements for storage. When the rack 100 is in use, the lower portion 102, the upper portion 104, and the bicycle support members 106 are all rotated around pivot member 110 to orient them as necessary to securely fit the rack 100 onto a specific vehicle for carrying a bicycle.

Comprise, include, and/or plural forms of each are open ended and include the listed parts and can include additional parts that are not listed. And/or is open ended and includes one or more of the listed parts and combinations of the listed parts.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An adjustable bicycle rack for mounting on a vehicle, the rack comprising:
   a pivot member;
   a first portion comprising at least one first base member and at least one first support member;
   a second portion comprising at least one second base member and at least one second support member,
   wherein a first end of each of the at least one second base member is attached to the pivot member, and wherein a second end of each of the at least one second base member is attached to one of the at least one second support member;

at least one hinge assembly pivotally attached to the pivot member;

wherein a first end of each of the at least one first base member is attached to one of the at least one hinge assembly, and a second end of each of the at least first base member is attached to one of the at least one first support member;

a latch assembly attached to each of the at least one the hinge assembly, the latch assembly comprising a latch actuator and a latch pin connected thereto; and at least one bicycle support member, wherein the first end of each of the at least one bicycle support member is pivotally attached to the pivot member; and wherein the pivot member is provided with a plurality of channels for receiving the latch pin; and wherein the latch actuator is selectively actuated to insert or remove the latch pin from one of the plurality of channels for releaseably securing the hinge assembly and the lower portion with respect to the pivot member; and wherein the latch assembly further comprises a latch lever connected at a first end thereof to the latch actuator, connected to the latch pin at a second end thereof, and pivotally connected to a latch mount portion of the at least one hinge assembly; and wherein the plurality of channels is provided by a toothed ring attached to the pivot member.

2. The adjustable bicycle rack of claim 1 wherein the bicycle support member further comprises at least one bicycle attachment assembly disposed thereon.

3. The adjustable bicycle rack of claim 2 wherein the at least one bicycle attachment assembly comprises an aperture through the at least one bicycle support member, a pawl with an angled tooth pivotally mounted within the aperture, and a strap;

wherein a first end of the strap is attached to the at least one bicycle support member; and wherein a first side of the strap is provided with angled teeth thereon, such that when a second end of the strap is inserted into the aperture, the angled tooth on the pawl engages with the angled teeth on the strap to prevent the strap from being withdrawn from the aperture.

4. The adjustable bicycle rack of claim 3 wherein the pawl secures the strap between the angled tooth of the pawl and a side surface of the aperture.

5. The adjustable bicycle rack of claim 3 wherein the pawl further comprises a pawl release lever for disengaging the angled tooth of the pawl from the angled teeth of the strap to release the strap from the aperture.

6. The adjustable bicycle rack of claim 2 wherein the at least one bicycle attachment assembly comprises a latch pin attached to a latch carrier disposed within the at least one bicycle support member, and a latch actuator disposed outside the at least one bicycle support member and connected to the latch carrier via a slot provided in the at least one bicycle support member, wherein the latch pin may be inserted into a channel provided in the pivot member to prevent the rotational movement of the bicycle support member with respect to the pivot member.

7. The adjustable bicycle rack of claim 1 wherein the first portion, the second portion, and the at least one bicycle support member may be pivoted to a folded configuration when the latch pin is removed from a first channel, and secured by inserting the latch pin into a second channel.

8. An adjustable bicycle rack for mounting on a vehicle, the rack comprising:

a pivot member provided with a plurality of channels;

a first hinge assembly and a second hinge assembly pivotally attached to the pivot member;

a first latch assembly attached to the first hinge assembly, and a second latch assembly attached to the second hinge assembly;

an upper portion comprising a first upper support member, a second upper support member, and an upper base member, wherein a first end of each of the first upper support member and the second upper support member are attached to the pivot member, and a second end of each of the first upper support member and the second upper support member are attached to the upper base member;

a lower portion comprising a first lower support member, a second lower support member, and a lower base member, wherein a first end of each of the first lower support member and the second lower support member are attached to the first hinge assembly and second hinge assembly, respectively; and wherein the first latch assembly and the second latch assembly each comprise a latch actuator and a latch pin; and wherein the latch assembly further comprises a latch lever connected at a first end thereof to the latch actuator, connected to the latch pin at a second end thereof, and pivotally connected to a latch mount portion of the at least one hinge assembly; and wherein the plurality of channels is provided by a toothed ring attached to the pivot member.

9. The adjustable bicycle rack of claim 8 wherein the at least one bicycle support member further comprises at least one bicycle attachment assembly disposed thereon.

10. The adjustable bicycle rack of claim 9 wherein the at least one bicycle attachment assembly comprises an aperture through the at least one bicycle support member, a pawl with an angled tooth pivotally mounted within the aperture, and a strap;

wherein a first end of the strap is attached to the at least one bicycle support member; and wherein a first side of the strap is provided with angled teeth thereon, such that when a second end of the strap is inserted into the aperture, the angled tooth on the pawl engages with the angled teeth on the strap to prevent the strap from being withdrawn from the aperture.

11. The adjustable bicycle rack of claim 10 wherein the pawl secures the strap between the angled tooth of the pawl and a side surface of the aperture.

12. The adjustable bicycle rack of claim 10 wherein the pawl further comprises a pawl release lever for disengaging the angled tooth of the pawl from the angled teeth of the strap to release the strap from the aperture.

13. The adjustable bicycle rack of claim 9 wherein the at least one bicycle attachment assembly comprises a latch pin attached to a latch carrier disposed within the at least one bicycle support member, and a latch actuator disposed outside the at least one bicycle support member and connected to the latch carrier via a slot provided in the at least one bicycle support member, wherein the latch pin may be inserted into a channel provided in the pivot member to prevent the rotational movement of the bicycle support member with respect to the pivot member.

* * * * *